March 17, 1936.  G. LANGFORD  2,034,043
METHOD OF REFORMING RAIL JOINT BARS
Filed March 5, 1934
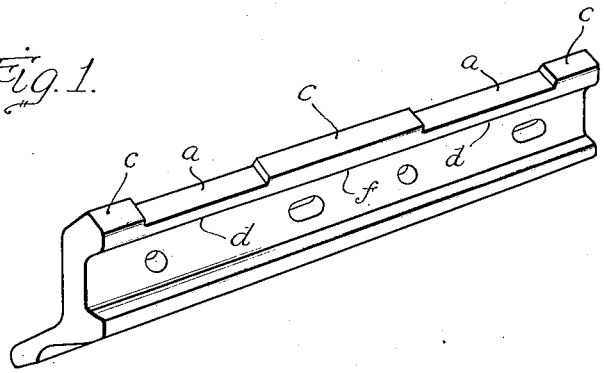
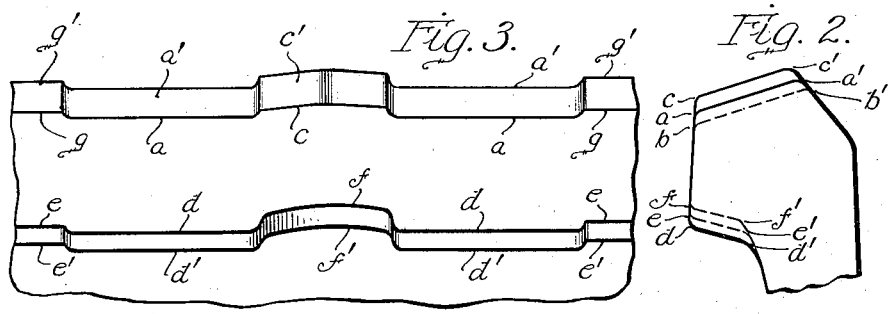 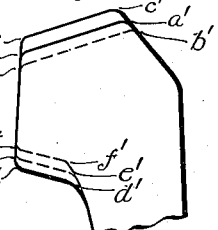
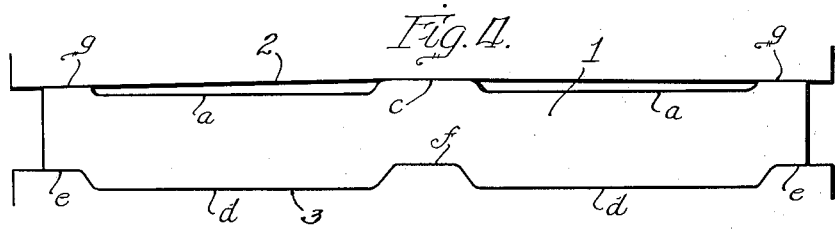
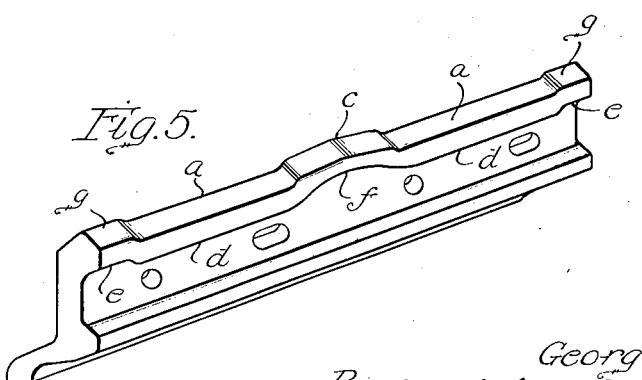
Inventor:
George Langford
By: Brown, Jackson, Boettcher & Dienner,
Attys.

Patented Mar. 17, 1936

2,034,043

UNITED STATES PATENT OFFICE 2,034,043

METHOD OF REFORMING RAIL JOINT BARS

George Langford, Joliet, Ill., assignor to McKenna Process Company of Illinois, Joliet, Ill., a corporation of Illinois Application March 5, 1934, Serial No. 713,962

2 Claims. (Cl. 29—169)

This invention is directed to a novel method of reshaping or reforming new or worn rail joint bars to ones of a type which provides top and bottom rail-fishing contact at the center portion of the joint and at the ends, intermediate portions of the bar being removed from rail-fishing contact.

The present invention is disclosed in the following description and accompanying drawing.

Fig. 1 is an inside perspective view of the type of bar to which my invention particularly applies.

Fig. 2 is an end view, and Fig. 3 an inside view of a bar head, illustrating the novel reforming method of the present invention.

Fig. 4 is an inside view of a bar head showing further the method of Figs. 2 and 3.

Fig. 5 is a bar produced by the method of my invention. All of the figures are similarly lettered to avoid confusion.

The prior art has disclosed a method of reforming an ordinary worn bar into a bar with rail-fishing clearances whereby to restore or raise a worn part of a fishing surface, and in which pressure indentations are made each side of the worn part so that metal will be made to flow longitudinally from each side to the worn part, in amount to restore the worn part, the indentations each side of it also providing for rail clearance. This is disclosed in Disbrow Patent No. 1,855,946, issued April 26, 1932. In this method, not only is pressure required to make the indentations, but as is well known, some additional pressure is required to secure accurately finished fishing surfaces at the center and ends. One object of my invention is to accomplish the purpose with a minimum of power, intermediate portions of the bar being brought to the shape desired without the use of pressure indentations. Another object is to do this in a manner which will not subject the bar in process of manufacture to injurious stresses and thus create incipient flaws. An extremely important object is to provide intermediate clearances in a fishing surface of the bar without interrupting the continuity of the forming wall or means whereby accuracy of the fishing surface is secured at its center portion and end portions. There are other advantages which will become apparent to those who practice the bar reforming art.

It is well known that the greatest wear in a bar takes place on the top fishing surface and at the central portion for a restricted length. In reforming an ordinary crowned bar from a worn bar, the greatest restoration must take place at the center where there is the least metal. One purpose of my invention is to produce from a worn bar a crowned bar with intermediate clearances. I find in practice that in the majority of worn bars sent me for reforming it is desirable to make the fishing height "oversize" or greater throughout its entire length than in the original bar, in addition to the crown or increased height required at center. This oversizing is due to the fact that there is usually some wear in the rail ends not merely at the center of the joint but throughout its length, and also because there is a general demand for oversize so as to secure more wear take-up space than was originally provided. To produce an oversized crowned bar with intermediate clearances I apply pressure to the under side of the bar head of Fig. 1 to elevate surfaces "c," and remove pressure at "d" so as to leave surfaces "a" depressed. The central surface "c" is raised higher than the end surfaces "c," and is made of a length and shape to fit worn rail ends accurately. My method of doing this is as follows: Fig. 2 is an end view of the top member of a joint bar. The extreme central fishing surface wear is represented by the dotted line b—b'; the less worn ends by a—a'. c—c' is the crown central surface to be made from the worn central surface b—b'. Fig. 3 is a graphic inside view of Fig. 2. Instead of pressing indentations at "a" as described in the prior art, surfaces "a" are merely left as they were, surfaces "c" and "g" being elevated by pressure from below at "f" and "e", the crowned central surface at "c" being elevated more than the end surfaces at "g" by deeper indentations at "f" than at the two ends "e." In order to maintain the intermediate surfaces "a," relatively as depressions, pressure is removed from beneath at "d," so that surfaces "a" will not be forced upward. By this method little or no pressure is required to secure surface clearances "a," the reforming pressure being confined to the shaping of the central surface "c" and the two end surfaces "g."

Fig. 4, also a graphic inside view, shows the full length top member 1 of a bar between two walls or pressure means 2 and 3. It will be noticed that the top wall 2 is smooth from end to end and has no indenting projections as are necessary in the prior art to make the intermediate depressions. The novelty of my invention is the method whereby intermediate clearances are created without in any way endangering the accuracy of the important center portion and end portions of a fishing surface. The forming wall 2 in Figure 4 is smoothly machined from end to end and whether crowned or uncrowned may be machined to exactness in an ordinary planer. If the forming wall 2 had to press in the intermediate clearances "a", to make such a wall would require first planing along the line a—a and then cutting out depressions in the wall at g, c and g. These three depressions being relatively short would be very difficult to machine or grind in, and it would be impossible to keep them accurately aligned with each other on their fishing surfaces, such as could be done quickly and accurately by straight planing from end to end of the entire wall. To the best of my knowledge, it is this difficulty of making accurately such an indented forming wall that has prevented any extensive manufacture of bars of the type shown in Figure 1. I have manufactured many bars of this type and have found that the desired accuracy of the center and end fishing surfaces cannot be secured cheaply or correctly enough without recourse to some method similar to my present method.

The depressions "d" provide relief from pressure, so that the bar surfaces "a" will remain out of the plane of rail-fishing engagement when the fishing surfaces at center and ends are elevated and finished. Intermediate clearances "a" are thus created, not merely by compressing the bar members from above, but essentially by the reliefs from pressure beneath and comparatively little reforming is required; furthermore, there is much less distortion of the bar than would otherwise occur. This method permits of various applications; multiple rolling, bull-dozing, enclosed dies under a press, and other means. The important central and end fishing surfaces are shaped by compressing the metal of the bar member from below, but the intermediate clearances are made or maintained by relief from compression at the same time that the central and end fishing surfaces are finished. As these intermediate surfaces require only clearance, they need no finish as for the central and end contact surfaces, thereby saving expense in dies or other shaping means employed. The web portion of the bar is not deflected or depressed at its intermediate portions. At the center portion and ends where the top member is pushed upward, the web is lengthened vertically.

It may be thought that the worn bar would not position itself to the pressure as shown, but it must be remembered that this is only the top member and meanwhile the bottom member is being reformed or held, thereby holding the bar as a whole in position. Furthermore, it is well known to practical mill men that steel even when heated is reluctant to fill a roll or die groove except under pressure. It must be draughted or altered in shape by compression before it can be forced out of position in a forming groove. This reluctance to deformation is increased as the temperature of the steel decreases. For this reason, surfaces "a" in Fig. 4, undraughted because of the reliefs "d", are extremely reluctant to engage the die surface 2, this reluctance being increased or decreased as reliefs "d" are increased or decreased. Should it be found desirable to maintain a given amount of clearance depth with accuracy, means may be provided to hold surfaces "a" in prescribed amount below surfaces "c" and "g" before or during the operation shown in Fig. 4. In Fig. 4, the clearance g—a—c may be maintained by attaching a shim with face "a" to the die wall 2, or by some other guiding arrangement, surfaces "a" and "d" being spaced apart in amount to avoid compressing the metal of the bar member. The surface "a" of such an insert would serve merely as a guiding means as distinct from surfaces "g" and "c" which in conjunction with surfaces "e" and "f" respectively, draught or compress the bar member at those places, so as to thin the member. The intermediate portions of the member remain undraughted, depth a—d being greater than depths g—e and c—f. It can be seen from this description that even though a guiding means be added to maintain surface "a" of the bar member in a certain position, comparatively little pressure would be needed to hold surface "a" in a predetermined position, while reforming surfaces "g" and "c". The guiding means might be two widely spaced inserts, or even parts of the forming wall itself. The intermediate pressure reliefs are shown beneath the fishing surface, but they may be applied to either side of it, as the many sectional shapes of bars in use may require varied treatment. Reliefs from pressure may be applied to any of the faces of a member opposite or adjacent to a fishing surface, thereby making intermediate portions of a member wider instead of deeper than at the center.

This method of reshaping or reforming a bar to secure accurate fishing surfaces and intermediate rail-contact clearances, is related to the method disclosed in my Patent No. 1,808,468 issued June 2, 1931 wherein modifications of a fishing surface are secured by relieving selected surfaces of the bar from reforming pressure so as to effect in general a reduction of fishing surface width from the central portion to the ends. However, the present method, although related, is distinctive. In Fig. 3 the reforming pressure is first applied at the center and then at the ends and the greatest movement of metal is first at the center and then at the ends, intermediate portions being relieved of reforming pressure. This relief from pressure applies more particularly to the member itself than to any of its selected surfaces. The intermediate surfaces as a whole are withdrawn from rail contact and are not merely reduced in width. An entirely different type of bar is thus created as compared with the bars resulting from the method of my Patent No. 1,808,468. In the case of an uncrowned bar made from an unworn bar, the greatest pressure and greatest movement of metal would occur at the center and ends simultaneously and there would be substantially no pressure at the intermediate clearances, for even though there be guiding means to maintain a certain clearance depth at "a", the resulting pressure would be inconsequential as compared with the pressure required to finish the fishing surfaces "g" and "c".

A bar produced by the present method is shown in Fig. 5. Fishing surfaces "g" at the ends and "c" at the center are raised so that the total fishing height of the bar is made oversized, or at least higher than it was before reforming. The bar is crowned, that is, the central surface "c" is made higher than the end surfaces "g" and the crown is of proper shape and length to fit the worn rail ends to which it is applied.

The intermediate surfaces "a", not being raised, provide rail-contact clearances. The top member is thinner at the center than at the intermediate portions and thicker at the intermediate portions than at the center or ends. The member has no lateral deflection and is of non-uniform cross section throughout its length. While this bar is particularly adapted in the form shown for use on worn rails and as made from a worn bar, it may be also made new for use on either worn or unworn rails. It may also be made from a worn bar for use on new rails, and the top central surface "c" may be crowned or left uncrowned. If desired, the bottom member of the bar may be provided with rail-contact clearances at the bottom in the same manner as at the top. As might be expected, the method subjects the bolt holes to a minimum of distortion.

A bar of the type described cannot be brought into extensive use unless there be found some practical method of manufacturing it accurately and at a reasonable cost. The bar is of complicated shape, and a practical method of making it is important. The method of the present invention is practical and well adapted to the reforming of worn bars, also to the manufacture of new bars. In the latter case, one application of the method would be to first roll the bar to undersized fishing height. In cross section the bar would be preferably of the greatest possible vertical and lateral strength. When rolled it would be sheared or sawed to length. Each length would then be heated and reformed as previously described by applying pressure to the center and ends of a fishing surface member so as to raise and finish the fishing surfaces at those portions, leaving the unraised intermediate surfaces to function as clearances in the then finished bars.

What I claim is:

1. The method of reforming a rail joint bar to a bar of increased fishing height at its center and ends and providing for substantial lengths of top and bottom rail fishing contact at its center portion and extreme end portions, consisting in heating the bar and subjecting its top and bottom members to reforming pressure so applied as to cause the central portion and extreme end portions of at least the top fishing surface to move outwardly to increased fishing height, intermediate portions of said fishing surface being free from reforming pressure so as to substantially reduce the length of fishing surface subjected to reforming pressure, and so as to retain said intermediate portions in near their original positions to provide rail clearance.

2. The method of reforming a worn rail joint bar to a bar providing for substantial lengths of top and bottom rail fishing contact at its center portion and extreme end portions shaped to fit worn rail, consisting in heating the bar and subjecting its top and bottom members to reforming pressure so applied as to cause the central portion and extreme end portions of at least the top fishing surface to move outwardly to a height greater than in the original bar, and to greater height at the center than at the ends, intermediate portions of said fishing surface being free from reforming pressure so as to substantially reduce the length of fishing surface subjected to reforming pressure, and so as to retain said intermediate portions in near their original positions to provide rail clearance.

GEORGE LANGFORD.